United States Patent
Mendiratta et al.

(10) Patent No.: US 9,247,049 B2
(45) Date of Patent: Jan. 26, 2016

(54) APPLICATION SEQUENCING FOR ADVANCED COMMUNICATION FEATURES

(71) Applicant: Avaya Inc., Basking Ridge, NJ (US)

(72) Inventors: Harsh V. Mendiratta, East Brunswick, NJ (US); Raji Chinnappa, Allentown, NJ (US); Timothy Ross, Fair Haven, NJ (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/320,155

(22) Filed: Jun. 30, 2014

(65) Prior Publication Data

US 2015/0381802 A1      Dec. 31, 2015

(51) Int. Cl.
*H04W 8/20* (2009.01)
*H04M 3/42* (2006.01)
*H04W 4/00* (2009.01)
*H04W 4/16* (2009.01)

(52) U.S. Cl.
CPC ........ *H04M 3/4217* (2013.01); *H04M 3/42314* (2013.01); *H04W 4/001* (2013.01); *H04W 4/16* (2013.01)

(58) Field of Classification Search
CPC ......... H04W 4/08; H04W 4/005; H04W 8/22; H04L 65/1069; H04L 65/1003; H04L 65/40; H04Q 3/0016; H04Q 2213/1305; H04M 7/003; H04M 19/041; H04M 3/42059
USPC ............... 455/414.1, 426.1; 370/331, 352; 379/216.01
See application file for complete search history.

(56) References Cited

U.S. PATENT DOCUMENTS

| | | | |
|---|---|---|---|
| 6,801,609 | B2 | 10/2004 | Fullarton et al. |
| 2012/0076291 | A1* | 3/2012 | Bhogal et al. ............ 379/216.01 |
| 2012/0147881 | A1* | 6/2012 | Promenzio et al. ........... 370/352 |

* cited by examiner

*Primary Examiner* — Phuoc H Doan
(74) *Attorney, Agent, or Firm* — Sheridan Ross P.C.

(57) ABSTRACT

A communication system, method, and components are described. Specifically, a communication system having the ability to accommodate communication preferences for multiple users sharing a common line appearance is described. An application sequence can be determined and invoked based on communication preferences of the multiple users sharing a common line appearance.

20 Claims, 4 Drawing Sheets

APPLICATION SEQUENCING FOR ADVANCED COMMUNICATION FEATURES

FIELD OF THE DISCLOSURE

The present disclosure is generally directed toward communications and more specifically toward fulfilling communication preferences.

BACKGROUND

Shared Line Appearance (SLA) is one of the useful features that have been made available by traditional Private Branch eXchanges (PBXs). SLA has also been referenced as CO line, key system emulation, and the like. In essence, SLA is a feature that maps the line appearance (or a function key, button, etc.) on a phone to an analog port or a co-line or simply "the trunk." When a specific co-line is mapped to multiple phones, the activity of that line can be monitored and/or used by each phone. Thus, if "line 1" is busy, everyone that has their phone mapped to "line 1" can see that the line is busy. Likewise, if multiple users have their phones mapped to "line 1", then each user's phone will ring for an incoming call to "line 1." This means that any of the mapped users (e.g., users sharing the common line appearance) can pick up a call coming to "line 1." Moreover, a user can place a call on hold to "line 1" and any other user can pick up the same call from hold by connecting to "line 1" through the SLA feature. With SLA any user can join a call that has already been answered by another user sharing the common line appearance.

With SLAs, one person may not want to actually share credentials (e.g., login information, user names, passwords, etc.) with other users of the SLA. However, each user may have different call preferences or restrictions that require different applications to be sequenced for each user.

Other types of features that are currently provided by PBXs include Bridged Call Appearances, Hunt Groups, Coverage Answer Groups, Calling Groups, and Call Pickup Groups. These features also experience complications when different users belonging to such groups desire to have their call preferences or restrictions invoked.

CONSIDER THE FOLLOWING EXAMPLE

User B shares User A's appearance—a feature known as Bridge Call Appearance. In this case, when a call arrives for User A, both User A and User B are notified of the incoming call. Say User A has no restrictions on their communications (e.g., no communication preferences). Also say that User B has a restriction that he doesn't want to take calls after 8:00 PM.

In present solutions, if the call comes in to User A, User A's restrictions (or lack thereof) are considered, but User B's restrictions are not. This means that User B's line will ring after 8:00 PM even though User B has explicitly indicated that this should not occur. In other words, while advanced call features like SLAs, Bridged Call Appearances, Hunt Groups, Coverage Answer Groups, Calling Groups, and Call Pickup Groups are well known, most solutions for these advanced features only focus on preferences of a single user.

SUMMARY

It is with respect to the above issues and other problems that the embodiments presented herein were contemplated. In particular, embodiments of the present disclosure propose a mechanism that enables calling preferences (e.g., origination calling preferences, inbound calling preferences, and combinations thereof) of users sharing an appearance (e.g., sharing a common line appearance or having a shared appearance of a Session Initiation Protocol (SIP) Address of Record (AoR)) to have their specific and individual calling preferences invoked for incoming and/or outgoing calls that use the shared line. In particular, the entity responsible for invoking call features for a user may be configured to accommodate call preference of multiple users that are sharing a common line appearance.

For incoming calls, assume that User A and User B are sharing User A's appearance. When a call comes into a communication system (e.g., an enterprise network) for User A, the logic that invokes features or applications to fulfill the communication preferences of User A (e.g., a feature sequencer) considers User A's communication preferences, which may be in the form of preferred added features to default features already provided by the communication system and/or restrictions on default features. Thereafter or simultaneous therewith, the feature sequencer further considers User B's restrictions/preferences and will invoke any applications or apply any restrictions per consideration of User B's restrictions/preferences. In some embodiments, the shared appearance's feature sequence (User A in this example) would cause all of User A's features to be sequenced and the call-initiation message (e.g., SIP INVITE) is delivered to User A's appropriate devices as well as being routed to User B. When the call-initiation message is routed toward User B, then User B's communication preferences are considered and User B's features would be sequenced. It is interesting to note that since User B received the call-initiation message after User A's features have already been sequenced, then User B will have the advantage of both User A's features as well as User B's features if User B answers the call at his/her device. After both users have been considered and the appropriate applications have been identified and invoked, the call-initiation message (e.g., a SIP INVITE) is delivered to the appropriate target device(s) of User A and User B; therefore, at least two devices have the call-initiation message delivered thereto.

In some embodiments, every application for User A and every application for User B can be sequenced prior to delivery of the call to the target device. In some embodiments, certain redundant applications may not be required for User B if they are already sequenced per User A's restrictions/preferences. For example, it may not be necessary to sequence a second instance of a call recording application for User B if such an application is already sequenced for User A. In some embodiments, only User A's applications are sequenced for User A, whereas User B will have applications sequenced according to both User B's restrictions/preferences as well as User A's restrictions/preferences. In other words, since User B is sharing User A's appearance, User B will automatically have applications sequenced according to restrictions/preferences of User A and User B.

For outgoing calls, a similar process may be followed. In particular, again assume that User A and User B are sharing User A's appearance. If User B initiates a call for User A, the applications are invoked for User B and then for User A in accordance with each user's communication preferences and/or restrictions. Only after the restrictions/preferences of both users have been considered and accommodated will the call be allowed to go out toward the target device.

Accordingly, the present disclosure provides a complete call framework that ensures all participants' applications are invoked even when two or more of the participants are sharing an appearance. It is a further aspect of the present disclosure to attempt to minimize the unnecessary invocation of multiple applications where possible.

Thus, where prior art shared appearance solutions have no concept of considering call restrictions or preferences for multiple users, the present disclosure considers such restrictions or preferences prior to delivering the call (inbound or outbound). In other words, embodiments of the present disclosure enable call restrictions or preferences of multiple users sharing an appearance to be considered and accommodated via appropriate application sequencing.

In accordance with at least some embodiments of the present disclosure, a method sequencing applications for users sharing an appearance on at least one of a common line and a common AoR is provided which generally comprises:

determining that a call-initiation message is at least one of incoming to or outgoing from at least one of a first line and a first AoR while a first user and a second user are sharing an appearance on the at least one of a first line and first AoR;

determining communication preferences for the first user;

determining communication preferences for the second user; and invoking an application sequence for at least a portion of the call such that communication preferences for the first and second user are both at least partially accommodated during the at least a portion of the call.

It should be appreciated that communication preferences may correspond to requests for communication features in addition to default communication features that would otherwise be provided during the call if no personal communication preferences of the users were considered. Alternatively or additionally, communication preferences may correspond to restrictions on calls that may be enforced by the addition of an application or that may be enforced by network equipment (e.g., a firewall). Further still, the communication preferences of a user may correspond to specific preferences provisioned by the user themselves and/or they may correspond to preferences provisioned by a system administrator on behalf of the user. In some situations, a communication preference may even correspond to a default feature or function provided during a call for a user.

It should also be appreciated that the term "call" and communication preferences for a "call" may correspond to preferences for an audio call, a video call, an Instant Messaging (IM) session, a Web Real-Time Communications (WebRTC) session, and any other type of communication session that utilizes knowledge about a communicant's communication preferences. Thus, embodiments of the present disclosure should not be construed as being limited to audio calls.

In some embodiments, feature sequences can be determined and supported with different application sequences for different portions (e.g., legs, branches, etc.) of a call. For instance, a feature sequence can be determined for the shared appearance and an application sequence can be invoked for that shared appearance. Thereafter, the call can be forked to each user, thereby creating independent call legs for each user. Once forked, each user's leg would have features determined independently therefor and each leg may have the appropriate applications sequenced therefor. This new application sequence for each user's leg may or may not include the application sequence for the shared appearance. These features for each leg may have different parameters, although not necessarily. For example, both User A and User B may have a "block calls after" feature, but User A's feature may be configured to block after 9 pm, while User B's feature is configured to block after 8 pm. Assuming there exists a shared appearance (e.g., appearance 1 for a trunk, group, call appearance) and Users A and B share that appearance, an incoming call (or specifically a call-initiation message) is routed to the shared appearance so as to obtain preferences for appearance 1 and sequence applications accordingly. Thereafter, the incoming call (or call-initiation message) is routed independently to User A and User B, thereby creating two call legs. User A's legs would then add applications to support User A's preferences, while User B's leg would add applications to support User B's preferences. So call leg to User A would get applications for appearance 1's preferences and User A's preferences, whereas call leg to User B would get applications for appearance 1's preferences and User B's preferences (to the exclusion of User A's preferences). Considering the above example, if the incoming call is received at after a time when appearance 1's preferences restrict the call, it is possible that applications for appearance 1 will entirely block the call, in which case, User A or User B would not get a chance to even see the call.

Additionally, preferences of a "user" may correspond to preferences defined for an individual user (e.g., Alice), a trunk, a hunt group, or any other logical group or entity. In other words, the first user and/or second user may correspond to actual individuals in some embodiments. Alternatively or additionally, the first and/or second user may correspond to one or more of a trunk, a hunt group, or any other logical entity.

As used herein, the term "line" may correspond to an actual line that is shared among two or more users. Alternatively or additionally, a shared appearance of a SIP AoR may also be considered a shared line appearance. Thus, a shared "line" may also correspond to a shared AoR without departing from the scope of the present disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
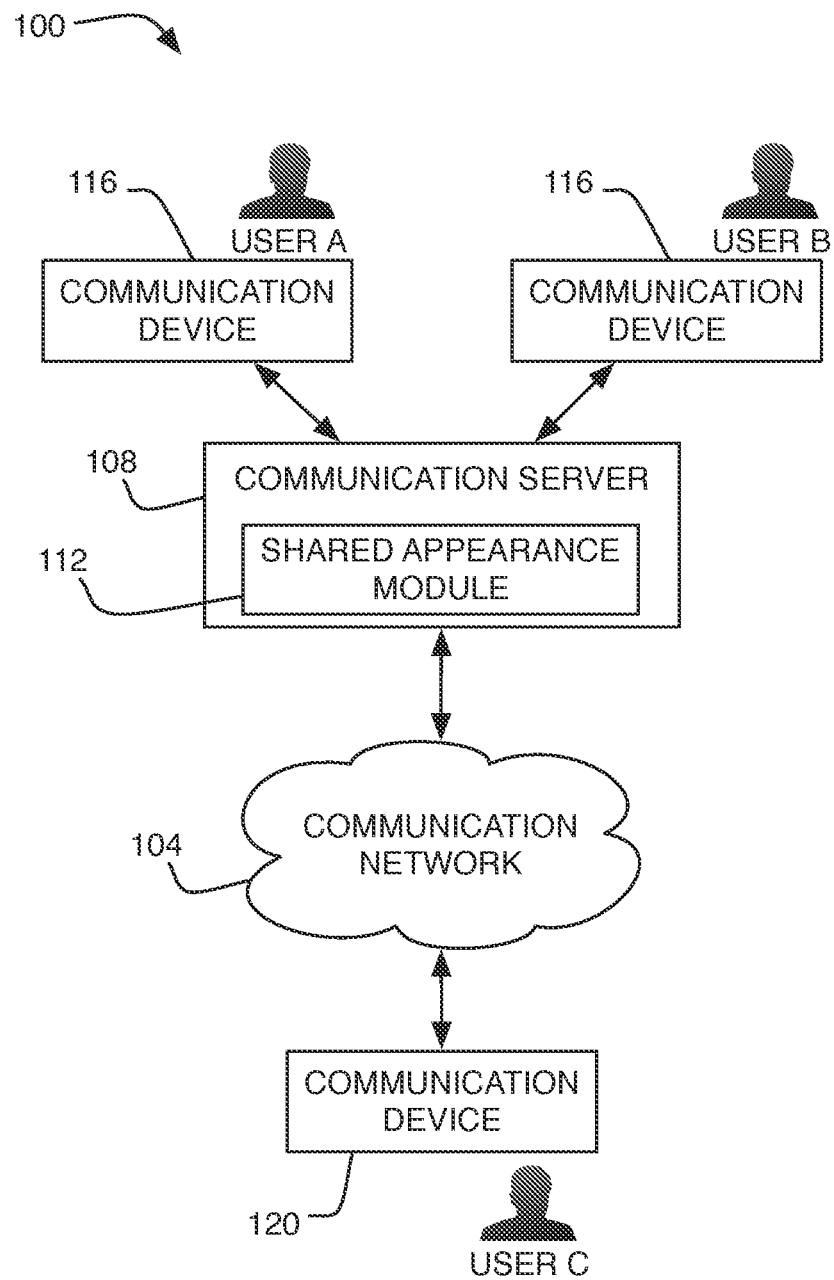
FIG. 1 is a block diagram of a communication system in accordance with embodiments of the present disclosure.

With reference initially to FIG. 1, a communication system 100 is depicted in accordance with embodiments of the present disclosure. The communication system 100 is shown to include a communication network 104 providing an interconnection between communication devices 116, 120 and a communication server 108. In some embodiments, two of the communication devices 116 may be registered with a common line or trunk of the communication server 108. In some embodiments, two or more users may be registered or sharing a common appearance of a SIP AoR. Either way, the communication devices 116 and/or users may have at least one of: a shared appearance of lines, a shared appearance of AoR, a shared appearance of groups (e.g., sales, marketing, etc.), a shared appearance of feature buttons, a shared appearance of logical identities, a shared appearance of resources (e.g., voice messaging), and the like). The users may also be parties to one or more group features (outside of shared appearances), such as Hunt Groups, Coverage Answer Group, Calling Group, and Call Pickup Group.

In some embodiments, the functionality of the shared appearance or group feature may be provided by a shared appearance module 112. Thus, although the shared appearance module 112 will primarily be described in connection with facilitating shared appearances (e.g., shared line appearances or shared appearance of SIP AoR), the shared appearance module 112 may also operate in connection with providing other call features, such as group features.

User A and/or User B may be in communication with User C at another communication device 120 that is also connected to the communication network 104. In some embodiments, the shared resource at the communication server 108 may correspond to a single communication port, a single trunk, an AoR, some other advanced communication feature or group feature, or the like and each communication device 116 may map a specific key (hard key or soft key) on the communication device 116 to the shared resource or communication feature.

In an example where the shared resource corresponds to a shared line, if User C calls the shared line, the call may be answered by User A or User B from their respective communication devices 116. Similarly, User A or User B may utilize the shared line to initiate a call toward the communication device 120 and the other user may be aware of the call by viewing a status of the shared line from their respective communication device 116.

As an example, the communication network 104 may comprise either a public or private communication network. As a further example, the communication network 104 may facilitate communications via packet-switched or circuit-switched protocols. Non-limiting examples of the network 104 include, without limitation, the Internet, the Public Switched Telephone Network (PSTN), a cellular network, an IMS network, an ISDN network, a Voice over IP (VoIP) network, any other packet-switched network, any other circuit-switched network, or combinations thereof. In one configuration, one of the communication networks 104 may comprise several different networks or collections of communications equipment and some of those networks may correspond to a public or untrusted communication network, such as the Internet, whereas others of the networks may correspond to enterprise communication networks, IMS networks, cellular networks or the like.

Figure 2:
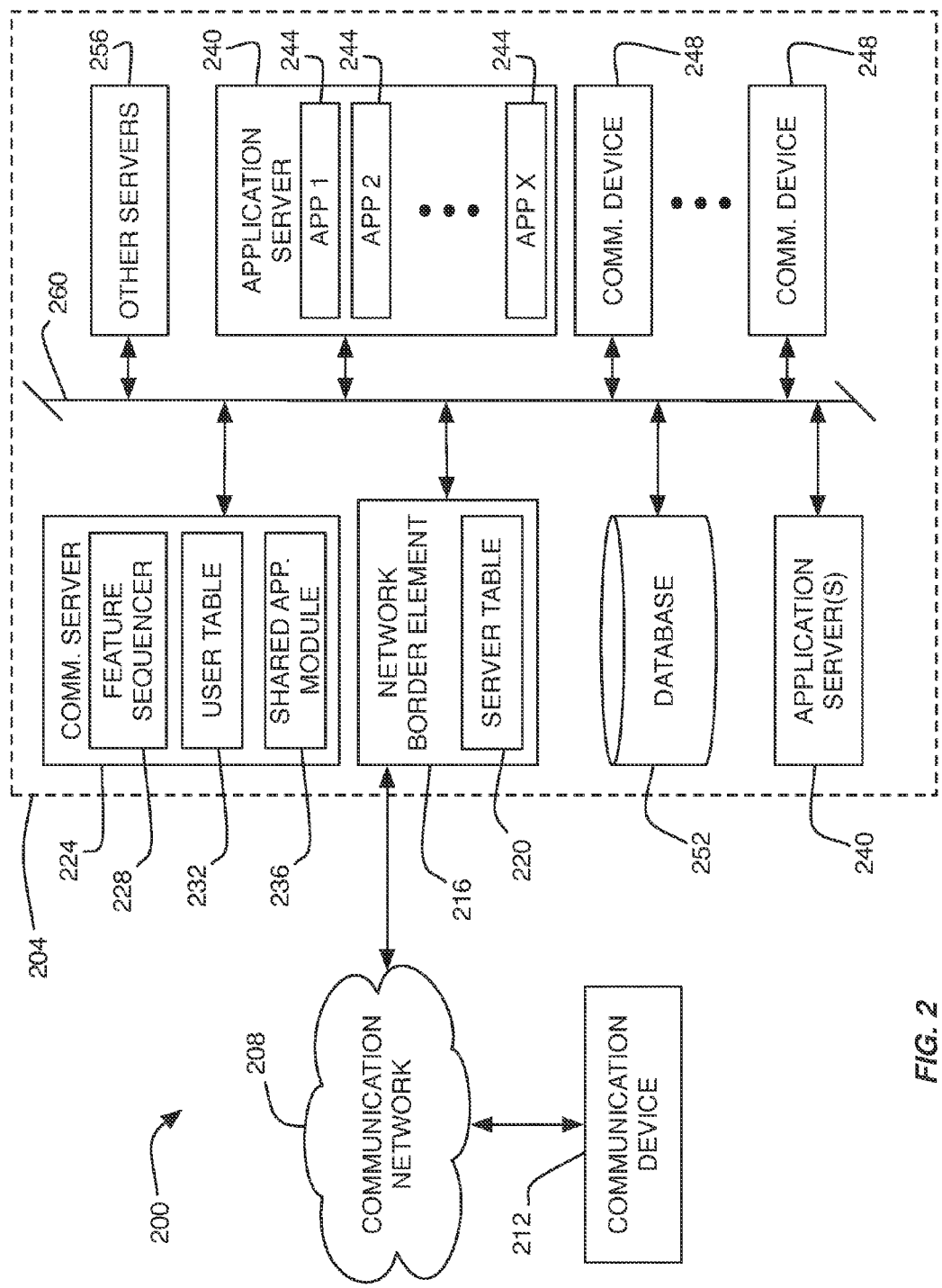
FIG. 2 is a block diagram depicting a detailed communication system in accordance with embodiments of the present disclosure.

With reference now to FIG. 2, additional details of a communication system 200 will be described in accordance with embodiments of the present disclosure. The communication system 200 may comprise similar components to the communication system 100. In particular, the communication system 200 is depicted as comprising an enterprise network 204 that is connected to one or more external communication devices 212 via a communication network 208. The communication device 212 may be similar or identical to the communication devices 116 or 120 and the communication network 208 may correspond or be similar to the communication network 104.

Components of the enterprise network 204 are depicted as including a network border element 216, a communication server 224 (which may be similar or identical to communication server 108), a plurality of communication devices 248 (which may also be similar or identical to the communications devices 120), one or more application/media servers 240, other servers 256, and an enterprise database 252. It should be appreciated that one or more of the components depicted as being within the enterprise network 204 may alternatively or additionally be provided outside the enterprise network 204.

The external communication devices 212 are generally referred to as "external" because they are either not under the direct control of the enterprise administering the enterprise network 204 or have a decreased level of trust with the enterprise network 204 as compared with communication devices 248 that are within the enterprise network 204. It should also be noted that some instances of device 248, which are controlled by the enterprise network 204, may be outside the network boundary, for example where extension to cellular features or remote workers are utilized. Illustrative types of external communication devices 212 include, without limitation, cellular phones, laptops, tablets, Personal Computers (PCs), Personal Digital Assistants (PDAs), digital phones, analog phones, and the like.

The communication devices 248 within the enterprise network 204, similar to the external communication devices 212, may correspond to user communication devices and, in some embodiments, may correspond to a UA or multiple UAs of enterprise users. Examples of communication devices 248 include, without limitation, a telephone, a softphone, a cellular phone, a multi-speaker communication device (e.g., conference phone), a video phone, a PC, a laptop, a tablet, a PDA, a smartphone, a thin client, or the like. It should be appreciated that a communication device 248 may be configured to support single or multi-user interactions with other communication devices 248 within the enterprise network 204 as well as other communication devices 212 that are external to the enterprise network 204.

The communication devices 212, 248 may include any collection of components (hardware and software) that enable users to exchange media (e.g., voice, video, etc.), data (e.g., emails, Short Message Service (SMS) messages, Multimedia Message Service (MMS) messages, files, presentations, documents, etc.) with one another's communication devices over the communication network 208 and/or within the enterprise network 204.

The enterprise network 204 may correspond to either a single-location enterprise network or a multi-location enterprise network. A single-location enterprise network may comprise a network backbone 260 that corresponds to a Local Area Network (LAN) that includes wired (e.g., Ethernet) and/or wireless (e.g., Wi-Fi) technologies. A multi-location enterprise network may comprise a network backbone 260 that is a Wide Area Network (WAN), which connects a plurality of LANs or similar network locations via one or more untrusted networks, such as the communication network 208.

In some embodiments, the network border element 216 is provided to separate the external communication devices 212 and the untrusted communication network 208 from the network backbone 260 and components contained within the enterprise network 204. As an example, the network border element 216 operates to secure the enterprise network 204 from malicious attacks from the communication network 208.

The network border element 216 may be provided with a server table 220. The server table 220 may correspond to any data structure or collection of data structures that enables the network border element 216 to appropriately route messages from the external communication devices 212 to one or more communication servers 224 of the enterprise network 204. Specifically, while the enterprise network 204 is only depicted as having a single communication server 224, it should be appreciated that some enterprise networks 204 may comprise a plurality of communication servers 224 and each of those servers may be authoritative for (e.g., provide services for) a subset of enterprise users. In such a scenario, messages received at the network border element 216 will be routed to the appropriate communication server 224 by referring to entries in the server table 220 that may define which communication server 224 is authoritative for an enterprise user that is a target of the received message.

In some embodiments, the communication server 224 may be used to help establish communication sessions, sequence applications, enable communication preferences for users, enforce communication restrictions on users, etc. Specifically, the communication server 224 may include a Private Branch eXchange (PBX), an enterprise switch, an enterprise server, combinations thereof, or any other type of telecommunications system switch or server. The communication server 224 is, in some embodiments, configured to execute telecommunication functions such as the suite of Avaya Aura™ applications of Avaya, Inc., including Communication Manager™, Avaya Aura Communication Manager™, Avaya IP Office™, Communication Manager Branch™, Session Manager™, System Manager™, MultiVantage Express™, and combinations thereof.

As noted above, although only a single communication server 224 is depicted in FIG. 2, two or more communication servers 224 may be provided in a single enterprise network 204 or across multiple separate LANs 260 owned and operated by a single enterprise, but separated by the untrusted communication network 208. In configurations where an enterprise or an enterprise network 204 includes two or more communications servers 224, each server 224 may comprise similar functionality, but may be provisioned for providing its features to only a subset of all enterprise users. In particular, a first communication server 224 may be authoritative for and service a first subset of enterprise users whereas a second communication server 224 may be authoritative for and service a second subset of enterprise users, where the first and second subsets of users generally do not share a common user.

Additionally, multiple servers 224 can support a common user community. For example, in geo-redundant and other applications where users aren't necessarily bound to a single application server, there may be a cluster of equivalent servers where a user can be serviced by any server in the cluster.

A communication server 224 can be configured to include user communication preferences in a user table 232, which map, for a corresponding (enterprise subscriber) user, to a set of communication preferences to be invoked for an incoming and/or outgoing contact for each user for whom it is authoritative. Even more specifically, in a traditional two-person call, communications between internal enterprise users (e.g., internal communication devices 248) may first be serviced by the originating user's authoritative communication server 224 during the origination phase of communications set-up. After the origination phase is complete, the authoritative communication server 224 of the terminating (or called) user may be invoked to complete the termination phase of communications set-up. In some embodiments, the communication server 224 for the originating and terminating user may be the same, but this is not necessarily required. In situations where more than two enterprise users are involved in a communication session, authoritative communications servers 224 for each of the involved users may be employed without departing from the scope of the present invention. Additionally, the authoritative communications servers 224 for each user may be in the same enterprise network 204 or in different enterprise networks 204, which are owned by a common enterprise but are separated by an untrusted communication network 208. When an external communication device 212 is involved in at least one of a call and/or transfer, then yet another communication server 224 may be invoked to sequence applications, as needed.

In accordance with at least some embodiments of the present disclosure, the communication sever 224 may include a feature sequencer 228 that is configured to instantiate the communication preferences for a calling and/or called user, regardless of whether or not the calling and/or called user are using an external communication device 212 or internal communication device 248. In some embodiments, the user communication preferences in the user table 232 may be provisioned by users and/or by administrative personnel on behalf of the users. The user table 232 may additionally or alternatively comprise default preferences for users if such preferences have not been provisioned by a user or administrative personnel. The communications preferences for a particular user are referenced by the feature sequencer 228 to determine which, if any, features should be incorporated into a communication session for the user. The feature sequencer 228 can actually provide communication features directly into the communication session or the feature sequencer 228 can determine an application sequence which will be invoked during set-up and used during the communication session. As can be appreciated, the application sequence can be set-up for new communication sessions or during a transfer or conference event. Moreover, with the assistance of a shared appearance module 236, the feature sequencer 228 can invoke an application sequence for each user sharing a common line appearance or a SIP AoR. Alternatively or additionally, the feature sequencer 228 can invoke an application sequence for each user subscribing to a group feature or some other advanced call feature. Thus, the communication server 224 can be configured to establish an application sequence based on some or all users sharing an appearance or subscribing to a communication feature within the enterprise network 204.

In accordance with at least some embodiments, the communication server 224 can determine an application sequence and cause one or more applications 244 to be sequenced into a communication session. In particular, the communication server 224 is configured to analyze a particular user's communication preferences as defined in the user table 232 and invoke the necessary applications 244 to fulfill such preferences. Once an application sequence is determined for a calling and/or called user, the communications server 224 passes the communication-establishing message (e.g., an INVITE message) to a first application in the application sequence, thereby allowing the first application to determine the parameters of the communication session, insert itself into the control and/or media stream of the communication session, and thereby bind itself to the communication session. Once the first application has inserted itself into the communication session, the first application either passes the communication-establishing message back to the communication server 224 to identify the next application in the application sequence or passes the communication-establishing message directly to a second application in the application sequence. Alternatively, or in addition, the message may be redirected, rejected, or the like. Moreover, parties and/or media servers may be added to the call by an application. As can be appreciated, this process continues until all applications have been included in the communication session and the process can be duplicated for each of the users involved in the communication session.

In a non-limiting example, if the shared appearance module 236 determines that a call is incoming toward or originating from a line/AoR being shared by two or more users, then the shared appearance module 236 will instruct the feature sequencer 228 of each user that is sharing the common line appearance. With such information, the feature sequencer 228 can invoke an application sequence by considering the preferences of some or all users sharing the common line appearance. In some embodiments, the feature sequencer 228 may invoke application sequences for every user. In some embodiments, the feature sequencer 228 may identify an optimal application sequence based on the combined communication preferences of the users sharing the common line appearance. Thus, communication preferences for multiple users can be accommodated by the communication server 224. More specifically, the shared appearance module 236 may cause the feature sequencer 228 to sequence different application sequences for different legs of a call, which occur naturally with shared appearances. For instance, if User B is sharing User A's appearance, then the shared appearance module 236 may cause the feature sequencer 228 to sequence applications that support User A's preference for User A, meanwhile User B may have their applications sequenced in addition to the applications that have already been sequenced to accommodate User A's preferences. Thus, User B's call leg may have applications sequenced for both User B's preferences and User A's preferences.

Although only two application servers 240 are depicted, one skilled in the art will appreciate the one, two, three, or more applications servers 240 can be provided and each server may be configured to provide a single application or a set of applications 244. The applications provided by a particular application server 240 may vary depending upon the capabilities of the server 240 and in the event that a particular application server 240 comprises a set of applications 244, one, some, or all of the applications in that set of applications 244 may be included in a particular application sequence. There is no requirement, however, that all applications in a set of applications 244 be included in an application sequence and there is no requirement as to the order in which applications are included in the application sequence. Rather, the application sequence is usually determined based on a user's communication preferences, which can be found in the user communication preferences table 232. Alternatively, or in addition, the applications that appear in a user's sequence vector and their order within that vector may be determined by a system administrator to satisfy business requirements.

Moreover, the application sequence can vary based on the media type(s) that are being used in the communication session. For instance, a user may have a first set of preferences for voice-based communications, a second set of preferences for video-based communications, and a third set of preferences for text-based communications.

The applications included in a particular application sequence are generally included to accommodate the user's preferences. Applications may vary according to media-type, function, and the like. Exemplary types of applications include, without limitation, an EC-500 (extension to cellular) application, a call-setup application, a call-recording application, a dynamic device pairing application, a voicemail application, an email application, a voice application, a video application, a text application, a conferencing application, a communication log service, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be included in a single application sequence without departing from the scope of the present invention.

In some embodiments, when the communication server 224 includes one or more applications 244 in a communication session, those applications may be configured to behave as a B2BUA. When an application, or any other communication element, behaves as a B2BUA, the application inserts itself in the control signaling path so that it can maintain complete call state and participate in all call requests. Likewise, when a communication session involves communication device 212 and communication device 248, the network border element 216 or its components may be incorporated into the communication session as a B2BUA, which means that all call control signaling passes through the network border element 216.

The other servers 256 may include any other type of server or switch needed for operating the enterprise network 204. Examples of suitable other servers 256 include, without limitation, presence servers, Instant Messaging (IM) servers, email servers, voicemail servers, virtual machines, web servers, call center servers, Interactive Voice Response (IVR) units, etc.

The enterprise database 252 may include information regarding enterprise users and/or non-enterprise users. Specifically, the enterprise database 252 may comprise information that identifies enterprise users, their relative position within the enterprise hierarchy, network permissions, communication permissions, Customer Relationship Management (CRM) information, etc. The enterprise database 252 may be any type of data storage system and may include one or more hierarchical databases, relational databases, or any other type of known database structure such as a SQL database. Alternatively or additionally, the database 252 may be constructed as a no-SQL database. The enterprise database 252, although depicted as being separate from the user table 232 in the communication server 224, may comprise the data regarding user communication preferences and may be accessible to the communication server 224 via a database lookup or query/response protocol.

It should be appreciated that some or all of the functions depicted in FIG. 2 may be co-hosted and/or co-resident on a single server. The depiction of components in FIG. 2 is generally intended to be a logical depiction of the components of the system 200.

Figure 3:
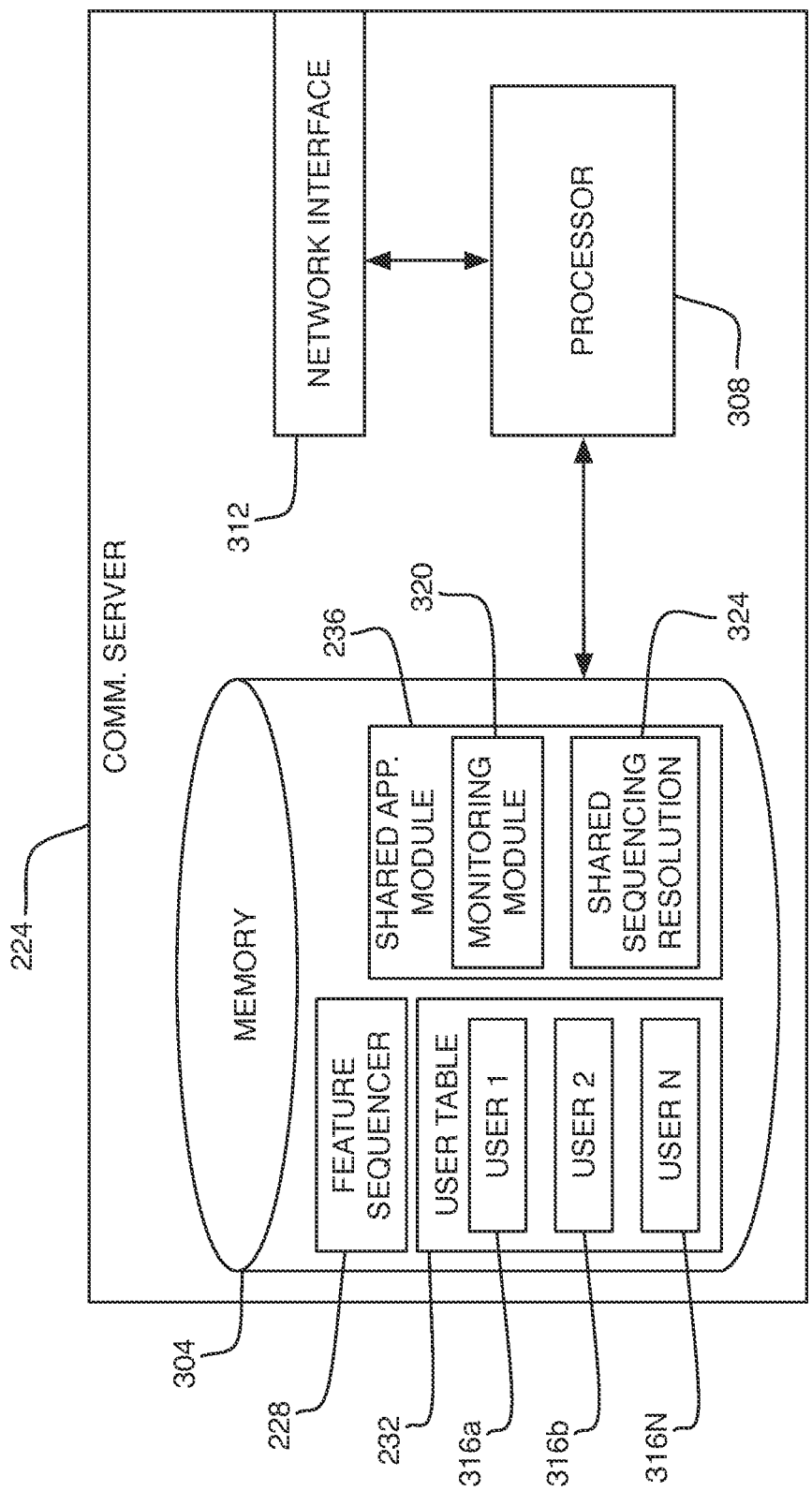
FIG. 3 is a block diagram depicting details of a communication server in accordance with embodiments of the present disclosure.

With reference now to FIG. 3, additional details of a communication server 224 will be described in accordance with embodiments of the present disclosure. While the communication server 224 is depicted as having certain components that enable the communication server 224 to provide certain features, it should be appreciated that certain components of the communication server 224 can be provided in other parts of the communication system 200 without departing from the scope of the present disclosure.

The communication server 224 is shown to include memory 304, a processor 308, and a network interface 312. The memory 304 may correspond to any computer-readable data storage medium and may be volatile or non-volatile memory. In some embodiments, the instructions stored in memory 304 are executable by the processor 308, thereby facilitating the behavior of the communication server 224. The processor 308 may correspond to any type of microprocessor, general processor, collection of computer processors, etc. The network interface 312 may correspond to any collection of hardware and/or software (e.g., drivers) that enable the communication server 224 to exchange communications over the communication networks 104, 208, 260. Examples of network interfaces 312 include, without limitation, Network Interface Cards, Ethernet ports, Ethernet drivers, antennas, wireless network drivers (e.g., 802.11N, Bluetooth, etc.), infrared ports, etc.

The types of instructions that may be stored in memory 304 and executed by the processor 308 include, without limitation, the feature sequencer 228 and the shared appearance module 236. Also, as discussed above, a user table 232 may be stored in memory 304 for reference by the feature sequencer 228 during its operation. The user table 232 may comprise communication preferences 316a-N for a plurality of users. It should be appreciated that N can correspond to any integer greater than or equal to one. It should also be appreciated that the data structure shown as being included in the user table 232 can be external to the communication server 224 and access by the feature sequencer 228 with a simple database query.

In operation, the feature sequencer 228 may determine that it is to invoke one or more applications for a calling or called user during a call-initialization phase. Once engaged, the feature sequencer 228 may refer to a user's communication preferences 316 (which may also include communication restrictions) within the user table 232. Based on a called or calling user's communication preferences 316, the feature sequencer 228 may cause one or more applications 244 to be sequenced into an application sequence, thereby allowing the applications to provide the desired features or enforce the necessary restrictions during the communication session. In a person-to-person call, this is a relatively simple endeavor as the feature sequencer 228 may only need to invoke applications for the calling user and then for the called user.

However, when the call is either being initiated by or is directed toward a user sharing a common line, sharing a SIP AoR, subscribing to an advanced call feature, belonging to a group or logical collection of users, etc., the shared appearance module 236 may be utilized to help the feature sequencer 228 identify each of the users that are sharing the line, sharing the AoR, subscribing to the same advanced call feature, belong to the same group or collection of users, etc. In particular, the shared appearance module 236 may be configured to utilize a monitoring module 320 to monitor all call-initiation messages that are being processed by the feature sequencer 228 (e.g., SIP INVITE messages that are received at the communication server 224). If the monitoring module 320 identifies a call-initiation message that is either coming from or directed toward a shared line/AoR/group, then the monitoring module 320 may invoke a shared sequencing resolution module 324. More specifically, monitoring module 320 may have knowledge about all lines and/or AoRs that are shared within the enterprise network 204 as well as knowledge about the various groups (e.g., Hunt Groups, Coverage Answer Group, Calling Group, and Call Pickup Group); thus, if any call-initiation message is coming from or directed to such a shared line/AoR/Group, the additional features of the shared appearance module 236 may be invoked.

When a call is originating from or directed toward a shared line, shared AoR, or predetermined group, the feature sequencer 228 may be informed about an identity of each user that is involved in such shared or belongs to such group. This information enables the feature sequencer 228 to consider the communication preferences 316 of each user. Accordingly, in some embodiments, the feature sequencer 228 begins the process of invoking applications or establishing an application sequence for each user sharing the line, sharing the AoR, or belonging to the group.

It should also be appreciated that the feature sequence 228, with the help of the shared appearance module 236, may facilitate sequencing features for multiple users depending on the leg of a forked call. As an example, User A may share its appearances with User B and User C. When a call comes into User A, the feature sequencer 228 will first sequence applications for User A. Thereafter, the call is forced to User A's devices as well as to Users B and C. The forked leg to User A's devices will receive no further sequenced applications, since User A's applications have already been sequenced. The forked call to User B adds the appropriate applications as per User B's communication preferences, so that leg will get User A and User B's sequenced applications. The forked call to User C adds the appropriate applications as per User C's communication preferences, so that leg will get User A and User C's sequenced applications. In this example, User C's leg will not see User B's applications, User B's leg will not see User C's applications, and User A's leg will not see User B or C's applications.

While it may be possible that the communication server 224 is responsible for invoking applications for each user sharing an appearance/belonging to a common group, it is not necessary. For instance, one communication server 224 may invoke a first application sequence for a first user and then a second communication server 224 may invoke a second application sequence for a second user. In other words, the application sequencing responsibilities may be shared among multiple communication servers 224 for users sharing an appearance or belonging to a common group.

The shared sequencing resolution module 324 may enable the feature sequencer 228 to resolve conflicts between user communication preferences 316a-N of users sharing an appearance/belonging to a group as well as optimize an application sequence for multiple users sharing an appearance/belonging to a group. As an example, if a first and second user are sharing a common line appearance and each user has call recording identified in their communication preferences 316, the shared sequencing resolution module 324 may instruct the feature sequencer 228 to only invoke a single instance of a call recording application as two instances of a call recording application would be redundant, unnecessary, and a waste of processing resources. As another example, if a first user's communication preferences 316 define the need for an extension to cellular or twinning feature but a second user's communication preferences 316 define that twinning or extending a call directed toward that user to an external communication device 212 is prohibited (e.g., the first user's communication preferences 316 contradict or violate the second user's communication preferences 316), then the shared sequencing resolution module 324 may be invoked to resolve the conflict. In some embodiments, the conflicting preferences 316 may both be ignored. In some embodiments, the conflicting preferences 316 may be resolved based on security policies of the enterprise network 204. In some embodiments, the conflicting preferences 316 may be resolved based on a hierarchy of users as defined within the shared appearance module 236 (e.g. user 1 is a manager and user 2 is a contract employee, then user 1's preferences are used).

Figure 4:
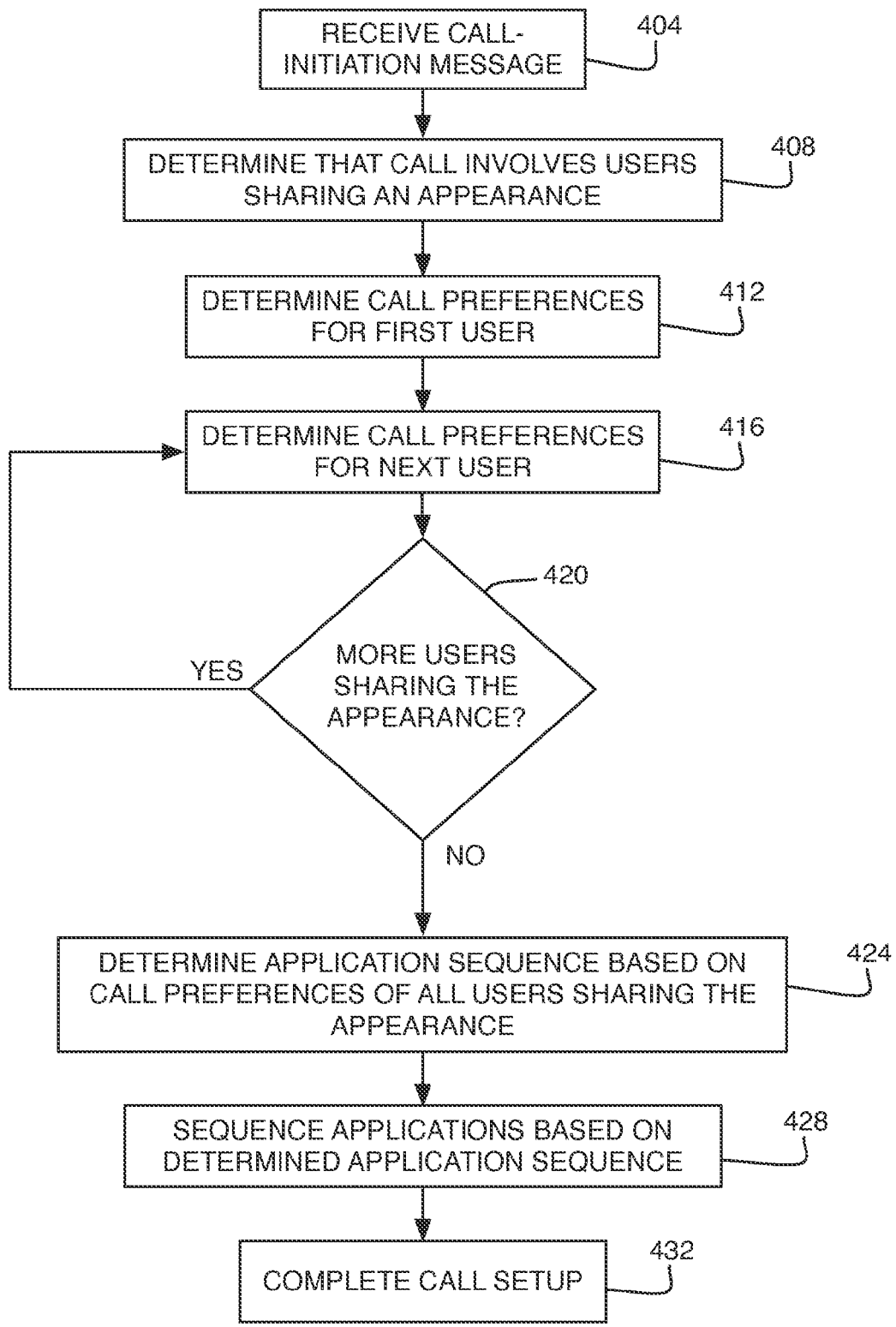
FIG. 4 is a flow diagram depicting a method of providing call features for multiple users sharing a common line appearance in accordance with embodiments of the present disclosure.

With reference now to FIG. 4, a method of providing call features for multiple users will be described in accordance with embodiments of the present disclosure. While the following method will be described in connection with providing or considering all call features for all user sharing a common line, sharing a SIP AoR, belonging to a common group, etc., it should be appreciated that embodiments of the present disclosure are not so limited. In fact, embodiments of the present disclosure may not necessarily sequence applications for all users, but instead applications may be sequenced in a hierarchical manner depending upon call path. Thus, if the path forks by virtue of a shared appearance or group function, some legs of the path may have a first set of applications and other legs of the path may have a different set of applications. The applications on one leg of a forked call may or may not be the same as applications on another leg of the forked call—this determination may be user-dependent or determined by call preferences defined by an administrator.

The method begins when a call-initiation message (e.g., a SIP message) is received at a communication server 224 for processing (step 404). Once received, the shared appearance module 236 utilizes the monitoring module 320 to determine if the call involves users sharing an appearance, belonging to a common group, etc. (step 408). In particular, the monitoring module 320 may check the origination and destination addresses to determine if the call will involve users sharing an appearance, belonging to a common group, etc. within the enterprise network 204. This may be done by referring to an internal list of users or by referencing an external data structure to identify such users.

If the call does not involve users sharing an appearance or some other group function, then the feature sequencer 228 is allowed to process the call-initiation message in a normal fashion. This my involve sequencing features for the appearance, group, a subset of the group, etc. However, if the call involves users sharing an appearance, belonging to a group, etc., then the feature sequencer 228 determines call preferences for a first user that was identified as sharing the appearance, belonging to the group, etc. (step 412). This may be done by reference communication preferences 316a for the first user in the user table 232.

Thereafter, the feature sequencer 228 then determines call preferences for the next user that was identified as sharing the appearance or belonging to the group with the first user (step 416). This process will continue to be repeated until all users sharing the appearance or belonging to the group have been considered by the feature sequencer 228 (step 420). Once all communication preferences for the users have been determined by the feature sequencer 228, the method continues with the feature sequencer 228 determining an application sequence that is based on the preferences of all users sharing the common line appearance (step 424). In some embodiments, the shared sequencing resolution module 324 may be invoked to help resolve preference disputed or contradictions. Furthermore, the shared sequencing resolution module 324 may be used to optimize an application sequence if two or more users have similar or identical preferences that can be fulfilled by invoking a single application instance 244 rather than multiple instances of the same application. Additionally or alternatively, there may be different applications invoked for different call legs.

After the appropriate application sequence has been determined by the feature sequencer 228, the method continues with the feature sequencer 228 establishing the determined application sequence for the users sharing the common line appearance (step 428). This step may involve passing the call-initiation message back and forth among the applications 244 that have been identified for inclusion in the application sequence, thereby allowing the applications 244 to place themselves into the call signaling path or media stream as appropriate. Thereafter, the call setup is completed by eventually passing the call-initiation message to the destination address (step 432).

A more specific, but non-limiting example of the above method, a call may involve Users B and C sharing an appearance of Group A (e.g., a sales group). Group A may have a first set of applications that are sequenced on its behalf before alerting any users belonging to the group. For instance, applications may be sequenced that add URLs into the call-initiation message that are specific or relevant to a calling customer. Applications may also be sequenced that block known abusers of the group. Once the applications defined for Group A have been added to the call sequence, the method may continue by adding specific applications to each leg of the call depending upon the specific preferences of User B and User C. Specifically, User B may have an application that blocks calls after 8:00 PM. Therefore, if a call comes to Group A, the applications for Group A will run (adding the caller URLs and blocking abusers), but then the leg to User B should block after 8:00 PM. As for User C, however, the call leg will be allowed to go through as long as User C does not have any call blocking rules defined like User B. In this example, both User B and User C belong to Group A, but are separate individuals and the applications invoked specifically for User B should not be invoked for or seen by User C, and vice versa.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method of accommodating communication preferences for multiple users sharing an appearance on at least one of a common line and a common Address of Record (AoR), the method comprising:
   determining, by a microprocessor, that a call-initiation message is at least one of incoming to or outgoing from at least one of a first line or a first AoR while a first user and a second user are sharing an appearance on the at least one of a first line or first AoR;
   determining communication preferences for the first user;
   determining communication preferences for the second user; and
   invoking an application sequence for at least a portion of the call such that communication preferences for the first and second user are both at least partially accommodated during the at least a portion of the call.

2. The method of claim 1, further comprising:
   determining that the communication preferences for the first user include a feature that is also included in the communication preferences for the second user;
   determining that the feature can be provided to the first user and the second user with a single instance of an application; and
   invoking a single instance of the application to provide the feature to both the first user and the second user.

3. The method of claim 1, further comprising:
   determining that the communication preferences for the first user at least partially contradict the communication preferences for the second user; and
   adjusting the application sequence such that the contradiction between the communication preferences of the first user and second user is resolved.

4. The method of claim 1, further comprising sharing, by the first user and second user, the appearance by each registering an endpoint with a common line in a Private Branch eXchange (PBX).

5. The method of claim 1, wherein the call comprises a first call leg and a second call leg, wherein the first call leg is associated with the first user and the second call leg is associated with the second user, wherein the first call leg comprises one or more applications that provide the communication preferences for the first user, wherein the second call leg comprises one or more applications that provide the communication preferences for the second user, and wherein the one or more applications on the first leg comprise at least one different application from the one or more applications on the second leg.

6. The method of claim 1, further comprising:
   determining that a third user is also sharing the appearance on the at least one of a first line or first AoR;
   determining communication preferences for the third user; and adjusting the application sequence to accommodate the communication preferences for the third user.

7. The method of claim 1, wherein the communication preferences for at least one of the first and second user comprise a restriction on communication functionality.

8. The method of claim 1, wherein a first communication server determines the communication preferences for the first user and a second communication server determines the communication preferences for the second user.

9. The method of claim 1, wherein at least one of the first user and the second user comprises at least one of a user, a trunk, a hunt group, and a logical entity.

10. The method of claim 1, wherein the call comprises at least one of an audio call, a video call, an Instant Messaging (IM) session, and a Web Real-Time Communications (WebRTC) session.

11. A non-transitory computer-readable medium comprising processor-executable instructions that are executable by a processor, the instructions comprising:
   instructions that determine that a call-initiation message is at least one of incoming to or outgoing from at least one of a first line or a first Address of Record (AoR) while a first user and a second user are sharing an appearance on the at least one of a first line or a first AoR;
   instructions that determine communication preferences for the first user;
   instructions that determine communication preferences for the second user; and
   instructions that invoke one or more applications for at least a portion of the call such that communication preferences for the first and second user are both at least partially accommodated during the at least a portion of the call.

12. The non-transitory computer-readable medium of claim 11, the instructions further comprising:
   instructions that determine that the communication preferences for the first user include a feature that is also included in the communication preferences for the second user;
   instructions that determine that the feature can be provided to the first user and the second user with a single instance of an application; and
   instructions that invoke a single instance of the application to provide the feature to both the first user and the second user.

13. The non-transitory computer-readable medium of claim 11, the instructions further comprising:
   instructions that determine that the communication preferences for the first user at least partially contradict the communication preferences for the second user; and
   instructions that adjust the application sequence such that the contradiction between the communication preferences of the first user and second user is resolved.

14. The non-transitory computer-readable medium of claim 11, wherein the first user and second user are sharing the appearance by each registering an endpoint with a common line in a Private Branch eXchange (PBX).

15. The non-transitory computer-readable medium of claim 11, wherein the call comprises a first call leg and a second call leg, wherein the first call leg is associated with the first user and the second call leg is associated with the second user, wherein the first call leg comprises one or more applications that provide the communication preferences for the first user, wherein the second call leg comprises one or more applications that provide the communication preferences for the second user, and wherein the one or more applications on the first leg comprise at least one different application from the one or more applications on the second leg.

16. The non-transitory computer-readable medium of claim 11, the instructions further comprising:
   instructions that determine that a third user is also sharing the appearance on the at least one of a first line or first AoR;
   instructions that determine communication preferences for the third user; and
   instructions that adjust the application sequence to accommodate the communication preferences for the third user.

17. A communication server, comprising:
   a processor; and
   memory including a feature sequencer and a shared appearance module, the shared appearance module, when executed by the processor, monitoring messages received at the server to detect whether a call being initiated involves at least one of a first line or a first Address of Record (AoR) on which a first user and second user are sharing an appearance and, when such a call is detected, invoke the feature sequencer to determine communication preferences for both the first and second user such that communication preferences for both the first and second user are at least partially accommodated for at least one leg of the call.

18. The server of claim 17, wherein the call comprises a first call leg and a second call leg, the first user being associated with the first call leg, the second user being associated with the second call leg, wherein the feature sequencer establishes different application sequences for the first and second call legs, respectively, based on the communication preferences of the first and second users.

19. The server of claim 17, wherein the feature sequencer establishes an application sequence based on the determined communication preferences for both the first and second user and wherein the application sequence comprises a plurality of applications sequenced as Back-to-Back User Agents (B2BUAs) in a call vector.

20. The server of claim 19, wherein the application sequence includes at least one application that provides communication features for both the first user and second user.

* * * * *